(12) United States Patent
Kalemba

(10) Patent No.: US 6,245,279 B1
(45) Date of Patent: Jun. 12, 2001

(54) SLIDING EDGE GATE FOR A HOT RUNNER MOLD

(75) Inventor: Jacek Kalemba, Mississauga (CA)

(73) Assignee: Husky Injection Molding Systems Ltd. (CA)

( * ) Notice: Subject to any disclaimer, the term of this patent is extended or adjusted under 35 U.S.C. 154(b) by 0 days.

(21) Appl. No.: 09/313,834

(22) Filed: May 18, 1999

(51) Int. Cl.7 .................................................. B29C 45/23
(52) U.S. Cl. .......................... 264/328.9; 425/564; 425/566
(58) Field of Search .................................... 425/562, 563, 425/564, 566; 264/161, 328.9

(56) References Cited

U.S. PATENT DOCUMENTS

| 2,890,488 | 6/1959 | Gemberling . |
| 3,936,261 | 2/1976 | Jones et al. . |
| 3,995,981 | 12/1976 | Fries . |
| 5,460,509 | 10/1995 | Sawafuji et al. . |

FOREIGN PATENT DOCUMENTS

| 0791448 | 8/1997 | (EP) . |
| 0800907 | 10/1997 | (EP) . |
| 0800908 | 10/1997 | (EP) . |
| 2152952 | 4/1973 | (FR) . |
| 7-068601 | 3/1995 | (JP) . |
| 8-085142 | 4/1996 | (JP) . |
| 9-066542 | 3/1997 | (JP) . |

OTHER PUBLICATIONS

"Why Automation for Chip Cards?", By Willi Truckenbrod, pp. 4–6.

Primary Examiner—Tim Heitbrink
(74) Attorney, Agent, or Firm—Bachman & LaPointe, P.C.

(57) ABSTRACT

The present invention relates to an apparatus for manufacturing a substantially flat article, such as a smart card, having at least one substantially flat edge. The apparatus includes a mold for forming the substantially flat article, which mold includes an inlet gate for allowing molten plastic material to flow into a cavity space defined by the mold. The apparatus further includes a source of molten plastic material, a passageway communicating with the inlet gate and the source of molten plastic material, and a blade or pin for pushing residual plastic material in the passageway into the cavity space formed so as to form a side edge for the substantially flat article having substantially no gate vestige. A method for manufacturing the substantially flat article is also described.

24 Claims, 4 Drawing Sheets

SLIDING EDGE GATE FOR A HOT RUNNER MOLD

BACKGROUND OF THE INVENTION

The present invention relates to hot runner edge gating nozzle for molding thin flat articles, particularly smart cards.

Flat parts of constant cross section thickness are typically gated at one end so that the molten plastic material, such as a plastic resin, flows the longest path to fill the part. In this way, molded in stresses which cause warpage are avoided. Such parts preferably are molded using an edge gate rather than a pin gate into one of the larger surfaces, because injecting the plastic material perpendicularly to the flow direction for filling can cause part blemishes, such as jetting, and warpage. Injecting the plastic material aligned with the flow direction for filling minimizes these problems.

Smart cards are wallet size plastic cards containing an embedded computer chip. The chip is an integrated circuit that can be preprogrammed to interact with sensors and readers that the card may come into contact with. Injection molding smart cards is becoming the preferred method of manufacture. The paper "Why Automation for Chip Cards", by Truckenbrod summarizes the current state of the smart card art. When using an injection molding technique, it is important to design the mold cavity gates so that flat warp free cards are molded without any gate vestige that may cause injury when the cards are handled.

Published European Patent Application No. 0 800 908 to Herbst shows an edge gating technique for molding articles such as smart cards. FIGS. 6 and 7 in this document show a sleeve that is advanced to sever the gate. If this sleeve is cylindrical, then the severed edge of the part will not be linear but rather circular. This technique is not well suited for making rectangular style cards.

Published European Patent Application 0 800 907 to Manner shows a conventional hot runner valve gate having a melt passage cut into the valve stem that feeds plastic resin transversely into the side of a mold cavity—in effect an edge gate. Again, the valve stem is cylindrical and will not produce a flat vestige free surface on the flat edge of a rectangular part.

U.S. Pat. No. 5,460,509 to Sawafuji shows a cold runner edge gating system with opposed knives that sever the frozen runner. U.S. Pat. No. 2,890,488 to Gemberling shows a movable hot runner nozzle that severs the gate after filling the cavity; however, pin gating into a flat surface is only shown.

Co-pending U.S. patent application No. 09/036,132 now U.S. Pat. No. 6,161,899 shows a slide gate approach for closing a hot runner pin gate.

None of these prior art documents illustrates how to hot runner edge gate a rectangular shaped article along a flat side to make a vestige free gate mark.

SUMMARY OF THE INVENTION

Accordingly, it is an object of the present invention to provide an apparatus and a method for manufacturing a rectangular shaped article which is substantially vestige free along a flat side.

It is a further object of the present invention to provide an apparatus and method as above which has particular utility in the manufacture of smart cards.

The foregoing objects are attained by the apparatus and the method of the present invention.

The present invention relates to an apparatus for manufacturing a substantially flat article, such as a smart card, having substantially flat edges. The apparatus preferably includes a mold for forming the substantially flat article, which mold includes an inlet gate for allowing molten plastic material to flow into a cavity space defined by the mold. The apparatus further includes a source of molten plastic material, a passageway communicating with the inlet gate and the source of molten plastic material, and a blade or pin for pushing residual plastic material in the passageway into the cavity space formed so as to form a side edge for the substantially flat article having substantially no gate vestige.

The method in accordance with the present invention broadly comprises the steps of providing a mold means for forming a substantially flat article, such as a smart card, having substantially flat edges, the mold means including a mold cavity and an edge gate for allowing molten plastic material to flow into a cavity space formed by the mold means, providing a source of molten plastic material having an outlet and a passageway between the outlet and the edge gate, creating a flow of hot molten plastic material from the source to the edge gate, substantially filling the cavity space with the hot molten plastic material, stopping flow of the molten plastic material into the passageway, and pushing any residual plastic material in the passageway into the cavity space so as to form a substantially vestige free side wall.

Other details of the apparatus and process of the present invention, as well as other objects and advantages attendant thereto, are set forth in the following description and the accompanying drawings in which like reference numerals depict like elements.

DETAILED DESCRIPTION OF THE PREFERRED EMBODIMENT(S)

Figure 1:
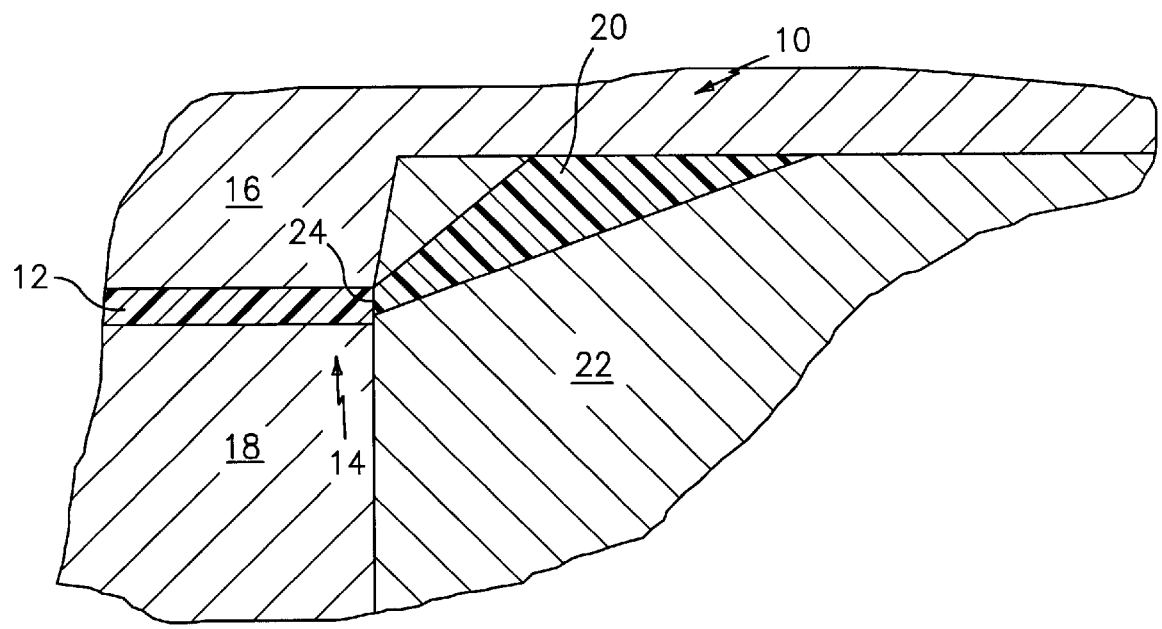
FIG. 1 is a sectional view of a typical cold side runner gate for manufacturing smart cards.

Referring now to the drawings, the cold runner tunnel edge gate shown in FIG. 1 illustrates how a poor gate vestige can result. The gate 10 is placed at one end of the part 12 within its thickness. After injection and when the plastic material has solidified, the mold 14 is opened. The cavity 16 moves away from the core 18 leaving the molded part 12 attached to a frozen runner 20 trapped in core runner block 22. The part 12 is then ejected from the core 18 severing the runner 20 from the part 12 at point 24. The resulting torn plastic surface is not smooth and may project quite sharp spikes that could easily cut a person's hand. As a consequence, a post mold machining operation is required to clean the edge of the part 12 and remove any sharp protrusions. This is both time consuming and expensive.

Figure 4:
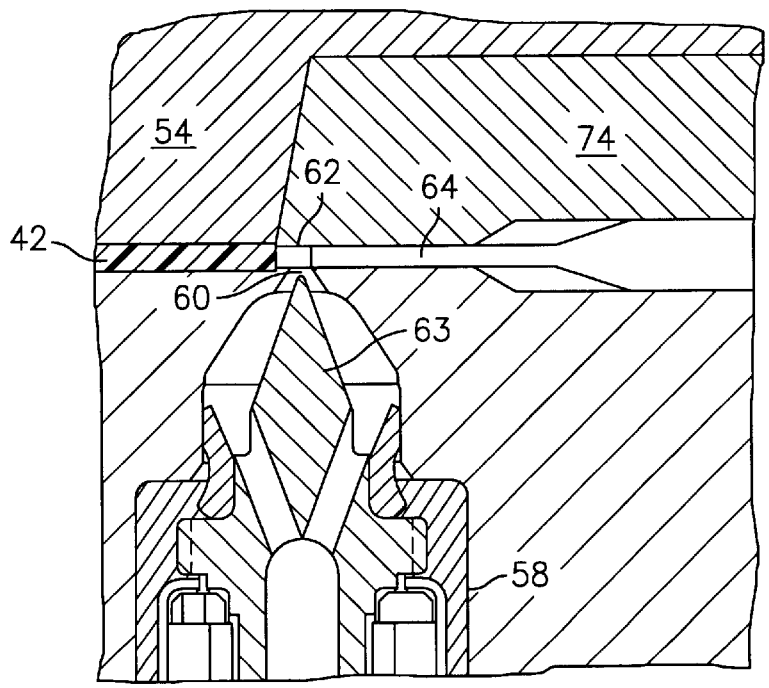
FIG. 4 is an enlarged sectional view through the gate area of the system of FIG. 3.
Figure 2:
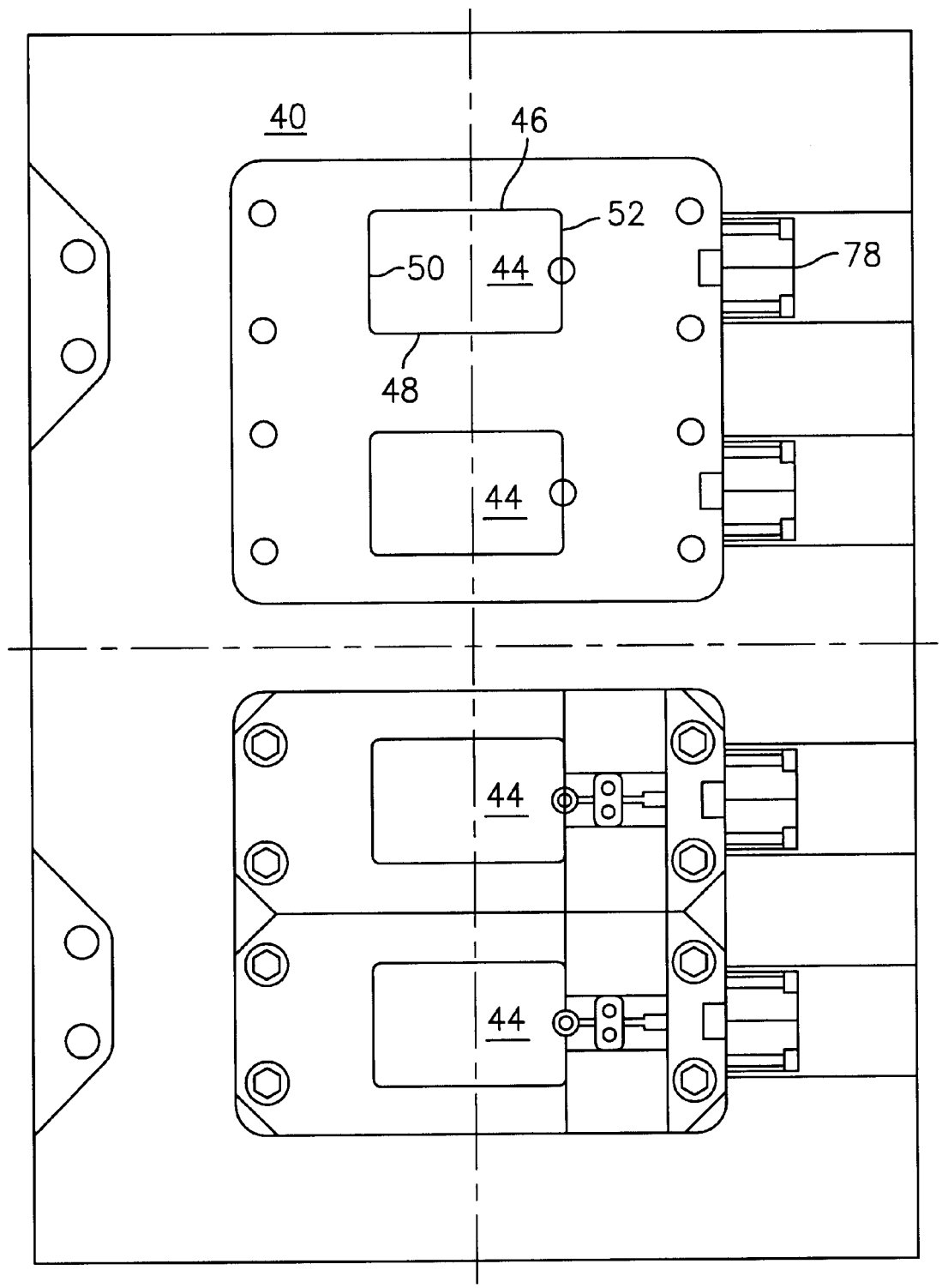
FIG. 2 is a plan view of a four cavity mold for manufacturing flat cards.
Figure 5:
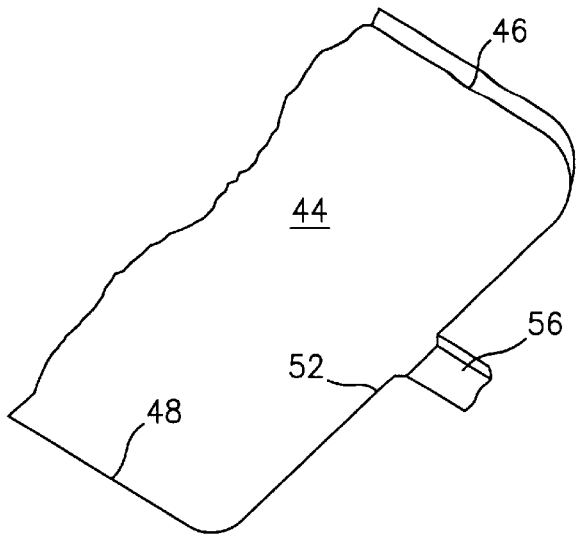
FIG. 5 is a partial isometric view of a mold cavity.
Figure 6:
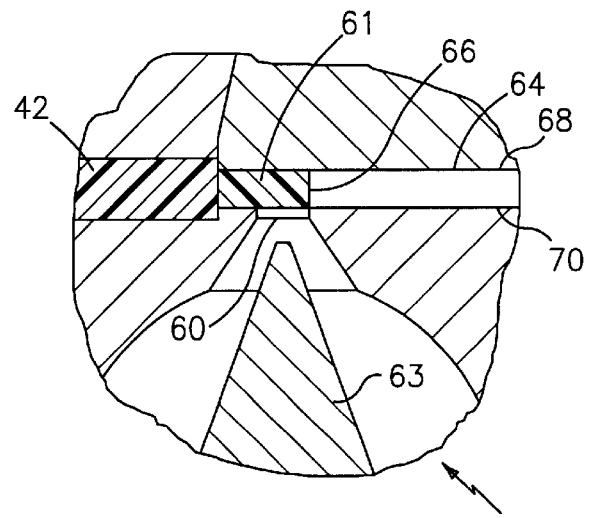
FIG. 6 is a sectional view through the gate area.

FIG. 2 illustrates a four cavity mold 40 for producing flat articles 42, such as smart cards. As shown therein and in FIG. 5, each mold cavity 44 in the mold 40 has four side walls 46, 48, 50, and 52, respectively. Each mold cavity 44 mates with a respective mold core 54 to form a cavity space (not shown) in the form of the flat article 42. Molten plastic material, such as a plastic resin, is supplied to the cavity space via an inlet gate 56 known as an edge gate. The edge gate allows the introduction of the plastic material in a direction aligned with the flow direction for filling the cavity space. The details of the edge gates 56 used in connection with each of the mold cavities 44 are shown in FIGS. 3, 4, and 6.

Figure 3:
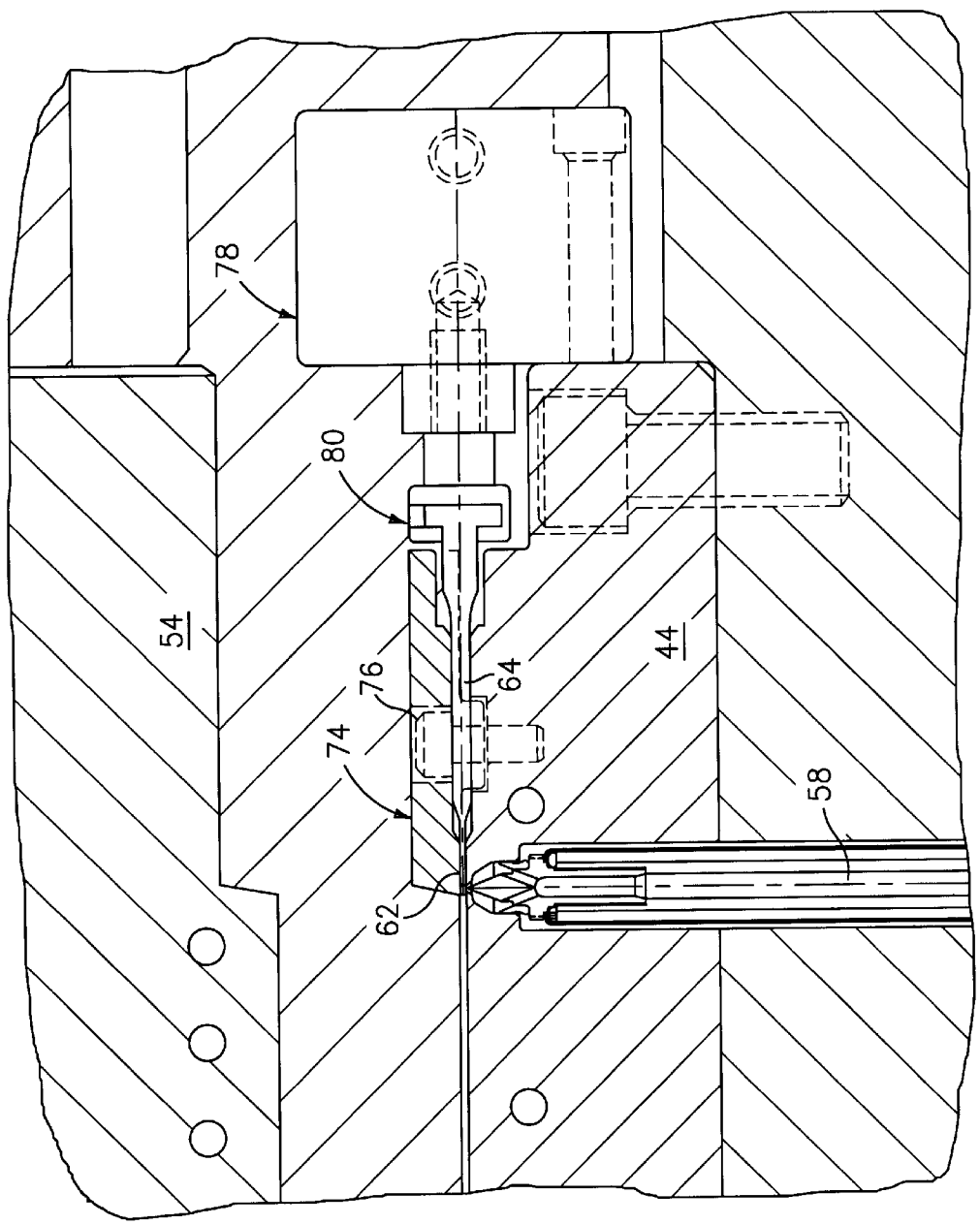
FIG. 3 is a sectional view of a hot edge gating system in accordance with the present invention.

Referring now to FIG. 3, one of the molds 40 is shown in an open position with the mold core 54 spaced apart from the mold cavity 44. Also illustrated is a hot runner nozzle assembly 58 for feeding hot molten plastic material, such as plastic resin, into the mold cavity space via the edge gate 56. The hot runner nozzle assembly 58 may comprise any suitable hot runner nozzle assembly known in the art. As shown in FIG. 4, the outlet 60 of the hot runner nozzle assembly 58 communicates with a passageway 62, known as a tab connection, which extends from a side wall 52 of the mold cavity 44. The passageway 62 terminates in the edge gate 56. Hot molten plastic material is fed from the nozzle assembly 58 to the cavity space via the passageway 62 until such time as the cavity space is filled. As the cavity space nears being fully filled, the source of molten plastic material is operated to stop the flow of plastic material. After cessation of the molten plastic material flow, there is residual molten plastic material 61 in the passageway 62. This material is known as a tab runner.

To form a molded article having a flat edge with substantially no gate vestige, a blade or pin 64 is provided. The blade or pin 64 moves in the passageway 62 in a direction towards and away from the mold cavity 44 and is oriented at substantially 90° with respect to the hot tip 63 of the nozzle assembly. At its innermost position, the blade or pin 64 closes the edge gate 56 and forms a part of the side wall 52. The blade or pin 64 serves two purposes. The first is to push any tab runner 61 from the passageway 62 into the mold cavity 44. In this way, the molded article 42 being formed has a flat side edge with no gate vestige. The second purpose of the blade or pin 64 is to seal the outlet 60 of the nozzle assembly 58 and thus prevent drooling of the molten plastic material. When the blade or pin 64 is moved away from the side wall 52, it opens the edge gate 56 and the outlet 60 of the nozzle assembly 58 for the next injection cycle.

The blade or pin 64 may comprise any suitable blade structure known in the art. The blade can be rectangular, square or circular in cross section, for example a cylindrical pin. In a preferred embodiment, the blade or pin 64 has a flat edge 66 and substantially flat upper and lower surfaces 68 and 70 respectively. As previously mentioned, the blade or pin 64 reciprocally moves in the passageway 62, which passageway may be formed in any desired manner and which has a cross sectional shape identical to the cross sectional shape of the blade or pin 64. In a preferred embodiment, the passageway 62 is formed by a portion of a mold cavity 44 and an insert 74. The insert 74 may be secured to the mold cavity 44 by any suitable means known in the art such as one or more bolts 76.

Movement of the blade 64 towards and away from the side wall 52 may be carried out using any suitable means known in the art. For example, a link (not shown) attached to any suitable actuation device (not shown) known in the art, such as a reciprocating motor, may be used to cause the movement of the blade 64 towards and away from the side wall 52. In a preferred embodiment, a cylinder 78 and a coupler 80 are used to move the blade 64 in each direction.

Figure 7:
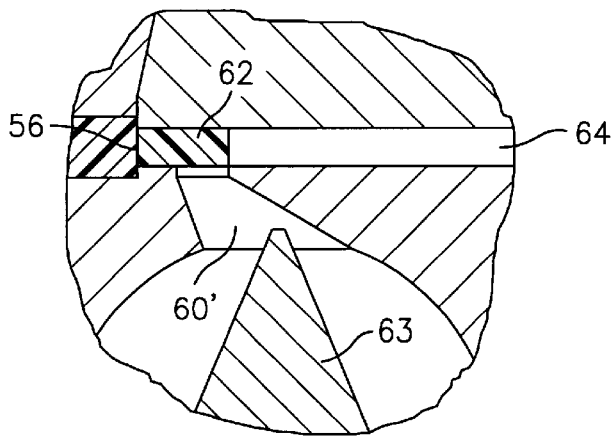
FIG. 7 is a sectional view of an alternative embodiment of a gating system in accordance with the present invention.

While the outlet 60 of the nozzle assembly has been illustrated as being perpendicular to the passageway 62, it is possible to use a gate orifice 60' in an angled direction to help promote flow of the molten plastic material via the tab connection 62 into the mold cavity space. FIG. 7 illustrates an angled gate orifice 60'.

While the apparatus and process of the present invention have been described in the context of manufacturing smart cards, they could be used to form other flat articles such as credit cards, memory cards, microcontroller cards, and contactless card/combi cards, or non-flat articles requiring clean gates that can be molded using this style of edge gate.

It is apparent that there has been provided in accordance with the present invention a sliding edge gate for a hot runner mold which fully satisfies the means, objects, and advantages set forth hereinbefore. While the present invention has been described in the context of preferred embodiments thereof, other alternatives, modifications, and variations will be apparent to those skilled in the art after a reading of the present description. It is intended to embrace all alternatives, modifications, and variations which fall within the broad scope of the appended claims.

What is claimed is:

1. A method for manufacturing a substantially flat article having at least one substantially flat edge comprising the steps of:

providing a mold for forming said substantially flat article having said at least one substantially flat edge, said mold including a mold cavity space formed at least in part by a mold cavity and an edge gate for allowing molten plastic material to flow into said cavity space;

attaching an insert to said mold so that a passageway aligned with said edge gate is formed by said insert and a portion of said mold cavity plate;

providing a source of molten plastic material having a hot runner assembly with an outlet which communicates with said passageway;

creating a flow of hot molten plastic material from said source to said edge gate;

substantially filling said cavity space with said hot molten plastic material;

stopping flow of said molten plastic material into said passageway;

providing a pushing device within said passageway which is aligned with said edge gate; and moving said pushing device towards said edge gate until a tip of said pushing device forms a portion of a side wall of said cavity space so as to push any residual plastic material into said cavity space and form an article having a substantially vestige free side wall.

2. A method according to claim 1, wherein said moving step further comprises closing said outlet of said source of molten plastic material and thereby preventing drooling of said molten plastic material.

3. A method according to claim 1, wherein said flow creating step comprises introducing plastic material from said source into said passageway in a substantially vertical direction.

4. A method according to claim 1, wherein said flow creating step comprises introducing plastic material from said source into said passageway in an angled direction to promote flow into said cavity space.

5. A method according to claim 1, further comprising:

said pushing device providing step comprising providing a blade having a flat edge;

said moving step comprising pushing said residual plastic material with said flat edged blade; and moving said blade until said flat edge closes said edge gate and forms a portion of a side wall of said mold cavity.

6. A method according to claim 1, wherein said flat article comprises a smart card.

7. An apparatus for manufacturing a substantially flat article having at least one substantially flat edge, said apparatus comprising:

a mold for forming a substantially flat article having at least one said substantially flat edge;

said mold including a cavity space and an inlet gate for allowing molten plastic material to flow into said mold;

said mold being formed in part by a mold cavity;

an insert attached to said mold and forming a passageway with a portion of said mold cavity;

a source of molten plastic material communicating with said inlet gate via said passageway, said molten plastic material source comprising a hot runner assembly for feeding hot molten plastic material into said passageway; and a device for pushing any residual plastic material within said passageway into said cavity space so as to form a side edge for said substantially flat article having substantially no gate vestige, said pushing device being aligned with said inlet gate.

8. An apparatus according to claim 7, wherein said source of molten plastic material has an outlet and said pushing device closes said outlet as said residual plastic material is being pushed into said cavity space, whereby drooling of said molten plastic material is prevented.

9. An apparatus according to claim 8, wherein said outlet is angled with respect to said passageway.

10. An apparatus according to claim 8 wherein said outlet is substantially perpendicular to said passageway.

11. An apparatus according to claim 7, further comprising:

said mold including a mold cavity having a side wall for defining said side edge of said substantially flat article; and said pushing device at its innermost position forming a portion of said side wall of said mold cavity.

12. An apparatus according to claim 1, further comprising:

said mold including a mold cavity; and means for reciprocally moving said pushing device towards and away from said mold cavity.

13. An apparatus according to claim 7, wherein said pushing device comprises a reciprocally movable blade.

14. An apparatus according to claim 7, wherein said pushing device comprises a reciprocally movable pin.

15. An apparatus according to claim 7, further comprising:

said mold including a mold cavity having a substantially flat side wall with said inlet gate; and said pushing device comprising a blade having a substantially flat edge which pushes said residual plastic material into said mold cavity, closes said inlet gate, and forms a portion of said side wall.

16. An apparatus according to claim 15, further comprising means for moving said blade towards and away from said mold cavity.

17. An apparatus according to claim 7, wherein said inlet gate comprises an edge gate for introducing said molten plastic material into said mold in a direction aligned with a flow direction for filling.

18. An apparatus for manufacturing a substantially flat article comprising:

a mold cavity for forming a substantially flat article with at least one substantially flat side edge;

said mold cavity having an edge gate for allowing molten plastic material to flow into the mold cavity;

an insert attached to said mold cavity and forming a passageway with a portion of said mold cavity;

a source of molten plastic material communicating with said edge gate, said molten plastic material source comprising a hot runner assembly for feeding hot molten plastic material into said passageway; and a device for pushing any residual plastic material created by operation of said molten plastic material source into said mold cavity via said edge gate so as to form a respective side edge for said substantially flat article having substantially no gate vestige requiring a subsequent smoothing operation, said pushing device being disposed within said passageway and being aligned with said edge gate.

19. An apparatus according to claim 18, further comprising:

said molten plastic material source having an outlet; and said pushing device closing said outlet and said edge gate.

20. An apparatus according to claim 19, wherein said pushing device comprises a flat edged blade which in its innermost position forms a portion of a wall of said mold cavity.

21. An apparatus according to claim 20, further comprising said passageway connecting said outlet to said edge gate and said blade being reciprocally movable within said passageway.

22. An apparatus according to claim 21, wherein said outlet is substantially perpendicular to said passageway.

23. An apparatus according to claim 21 wherein said outlet is oriented at an angle other than perpendicular with respect to said passageway.

24. An apparatus according to claim 23, wherein said pushing device comprises a pin.

\* \* \* \* \*

UNITED STATES PATENT AND TRADEMARK OFFICE
CERTIFICATE OF CORRECTION

PATENT NO.    : 6,245,279 B1                                      Page 1 of 1
DATED         : June 12, 2001
INVENTOR(S)   : Jacek Kalemba It is certified that error appears in the above-identified patent and that said Letters Patent is hereby corrected as shown below:

Column 5, claim 12,
Line 45, "claim 1" should read -- claim 7 --

Column 6, claim 24,
Line 52, "claim23", should read -- claim 19 --

Signed and Sealed this

Fifteenth Day of January, 2002

Attest:

JAMES E. ROGAN
*Director of the United States Patent and Trademark Office*

*Attesting Officer*